United States Patent [19]

Rothgery et al.

[11] Patent Number: 4,479,917

[45] Date of Patent: Oct. 30, 1984

[54] USE OF AMINOGUANIDINE COMPOUNDS AS OXYGEN-SCAVENGING AND CORROSION-INHIBITING AGENTS

[75] Inventors: Eugene F. Rothgery, North Branford; Steven A. Manke, Wallingford, both of Conn.

[73] Assignee: Olin Corporation, New Haven, Conn.

[21] Appl. No.: 551,235

[22] Filed: Nov. 14, 1983

[51] Int. Cl.$^3$ .............................................. C23F 11/04
[52] U.S. Cl. ...................................... 422/16; 210/750; 252/175; 252/178; 252/390; 252/394
[58] Field of Search ................ 210/750; 252/178, 180, 252/390, 394; 422/16

[56] References Cited

U.S. PATENT DOCUMENTS

| | | | |
|---|---|---|---|
| 3,551,349 | 12/1970 | Kallfass | 252/392 |
| 3,843,547 | 10/1974 | Kaufman et al. | 252/184 |
| 3,909,200 | 9/1975 | Redmore | 252/390 |
| 3,983,048 | 9/1976 | Schiessl et al. | 252/178 |
| 4,012,195 | 3/1977 | Noack | 21/2.7 R |
| 4,022,711 | 5/1977 | Noack | 252/389 R |
| 4,022,712 | 5/1977 | Noack | 252/389 R |
| 4,026,664 | 5/1977 | Noack | 252/2.7 R |
| 4,079,018 | 3/1978 | Noack | 252/389 R |
| 4,096,090 | 6/1978 | Noack | 252/389 R |
| 4,269,717 | 5/1981 | Slovinsky | 210/750 |

*Primary Examiner*—Thomas Wyse
*Attorney, Agent, or Firm*—William A. Simons; Thomas P. O'Day

[57] ABSTRACT

An oxygen-scavenging and corrosion-inhibiting agent for fluidic systems comprising an aminoguanidine compound selected from the formula:

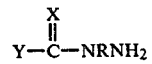

or a salt thereof, wherein R is selected from H or a lower alkyl group having 1 to 4 carbon atoms; wherein X is selected from NH or NNH$_2$; and Y is selected from —NH$_2$ or —NHNH$_2$.

11 Claims, No Drawings

USE OF AMINOGUANIDINE COMPOUNDS AS OXYGEN-SCAVENGING AND CORROSION-INHIBITING AGENTS

BACKGROUND OF THE INVENTION

1. Field of the Invention

The present invention relates to the use of selected aminoguanidine compounds as oxygen-scavengers and corrosion-inhibitors in fluidic systems.

2. Description of the Prior Art

Dissolved oxygen in fluids such as water may promote extensive pitting and other forms of corrosion to metal surfaces coming in contact with these fluids. For example, this corrosion may cause serious problems such as metal failure to boiler systems, hot water heating systems, and the like.

Accordingly, removal of oxygen from fluidic streams and systems is highly desirable in many instances. Such deoxygenation can be carried out by either mechanical or chemical means or with both. In those situations where chemical deoxygenation is desired, various chemicals including sodium sulfite, hydrazine, and hydroquinone have been employed as chemical oxygen-scavengers. See U.S. Pat. Nos. 3,551,349 (Kallfass); 3,843,547 (Kaufman et al); 3,983,048 (Schiessl); 4,012,195 (Noack); 4,022,711 (Noack); 4,022,712 (Noack); 4,026,664 (Noack); 4,079,018 (Noack); 4,096,090 (Noack); and 4,269,717 (Slovinsky) as teaching of the use of hydrazine or similar compounds as oxygen-scavengers and corrosion-inhibitors. All of these cited U.S. patents are incorporated herein by reference in their entireties.

Hydrazine, with or without one or more catalysts, has long been used as an oxygen-scavenger to remove dissolved oxygen in liquid systems such as boilers and hot water heating systems. However, hydrazine is a liquid with appreciable vapor pressure even at ambient temperatures and in aqueous solutions. For example, when an aqueous solution containing about 35% by weight $N_2H_4$ is allowed to equilibrate with its vapor in a closed space, there may be up to 500 parts by volume per million parts of air in the vapor space over the solution. Moreover, hydrazine is toxic to humans by skin contact and by inhalation. The inhalation toxicity may be aggravated by the vapor pressure of hydrazine, depending upon the use. Accordingly, precautions should be taken in the workplace to obviate the possibilities of skin contact and inhalation of hydrazine. Furthermore, the hydrazine-oxygen reaction is very slow at low operating temperatures such as room temperature. In those cases, one or more catalysts must be added to the system with the hydrazine.

It is still desirable to find a new oxygen-scavenger which retains all of the benefits of hydrazine, yet removes or lessens the above-noted undesirable effects of that compound.

The present invention achieves such a solution to this need by providing a non-volatile derivative of hydrazine which can be handled in the workplace without the danger of inhalation but which, in the boiler or hot water system or the like, functions as an oxygen-scavenger.

BRIEF SUMMARY OF THE INVENTION

Accordingly, the present invention is directed to a method for scavenging oxygen and for protecting metal surfaces against corrosion caused by oxygen-containing fluidic systems in contact therewith comprising adding an effective amount of an aminoguanidine compound to scavenge at least a portion of the oxygen contained therein and to inhibit corrosion on the metal surfaces in contact therewith; said aminoguanidine compound selected from the formula (I):

or a salt thereof; wherein R is selected from H or a lower alkyl group having 1 to 4 carbon atoms; X is selected from NH or $NNH_2$; and Y is selected from $-NH_2$ or $-NHNH_2$.

DETAILED DESCRIPTION

The compounds that may be employed in the method of the present invention include monoaminoguanidine, which has the formula (II):

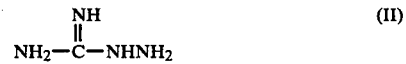

or one of the two tautomeric isomers of diaminoguanidine, which have the formulae (III) and (IV):

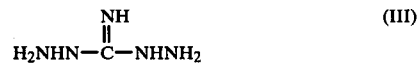

or triaminoguanidine, which has the formula (V):

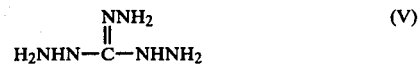

These compounds are normally made, isolated and handled in the form of their acid salts. Suitable acid salts include those of HCl, $HNO_3$, $H_2SO_4$, $H_3PO_4$ and $H_2CO_3$. Furthermore, these compounds, as salts or in aqueous solutions, give off essentially no hydrazine vapor.

The compounds of formulae (II), (III), (IV) and (V) may be made by reacting hydrazine with cyanamide or a guanidine salt. The mole ratio of hydrazine to the other reactant will determine whether the mono-, di- or triaminoguanidine compound is made. In the cases of where R is a lower alkyl group, a lower alkyl-substituted hydrazine is employed as a reactant. Of course, unsubstituted hydrazine (R=H) is most preferred because of cost.

According to the method of the present invention, an effective amount of at least one compound of formula (I), or a salt thereof, is added and admixed with the oxygen-containing fluid by a suitable mixing technique such as mechanical agitation or the like in order to lower the oxygen concentration of the treated fluid. For example, at room temperature and pressure, an aqueous solution saturated with oxygen in an atmosphere of air contains about 8 to 9 parts oxygen ($O_2$) per million parts of $H_2O$. Such aqueous solutions may be treated by the method of this invention to reduce the oxygen concentration to a range from about 1 to about 10 parts per billion or lower at operating conditions.

Generally, a sufficient amount of a compound of formula (I) is added to the oxygen-containing fluid so that its concentration, after admixing, but before reaction with the dissolved oxygen takes place, is from about 0.01 to about 1000, preferably from about 0.1 to about 100, parts of one or more of these compounds per million parts of fluid. Greater proportions may be employed if desired. These proportions may be effective in the treatment of boiler water in a boiler operated at pressures up to about 400 psig and at temperatures ranging from about 25° C. to about 400° C. Further, the same proportions may be used in refrigeration systems and other oxygen-containing fluids at temperatures down to 0° C., or less. In any event, the amount of active compound required to effectively scavenge oxygen from a fluid such as boiler water is dependent upon the amount of oxygen actually present therein. It is generally desirable that at least one mole of compounds of formula (I) be used per mole of oxygen ($O_2$). Of course, levels of these compounds far in excess of one mole per mole of $O_2$ may be required in certain systems, especially static storage systems. In those cases, treatment levels of 100 moles or more per mole of oxygen may be effective.

In the case of boiler systems, an active compound(s) of this invention may be added at any point. It is most efficient to treat the boiler feed water, preferably as it comes from the deaerator. Residence times prior to steam formation should be maximized to obtain maximum corrosion protection. Preferable residence times may range from about 2 minutes to about 20 minutes.

In one preferred embodiment it has now been found that the reaction between these aminoguanidine compounds and oxygen may be catalyzed by use of selected amounts of a quinone compound. Among the quinone compounds which may be used are the para-quinones, para-hydroquinones, para-naphthoquinones, para-anthraquinones, and the like, as well as their substituted derivatives. These include alkyl and aryl substituted quinone compounds as well as those having hydrophilic substituents. Among the desired quinone compounds which may be used are the alkylated and arylated para-quinones and para-hydroquinones having 1 to about 10 carbon atoms in the substituent, and those having substituents which are either derivatives of carboxylic acids, sulfonic acids, carboxylic acid alkali metal salts, or sulfonic acid alkali metal salts. Preferred are the lower alkyl para-quinones and para-hydroquinones having 1 to 5 carbon atoms in the alkyl substituents. Of these, the most preferred is methylhydroquinone, also known as toluhydroquinone.

The quinone compounds may be used in amounts of at least 0.0005 parts, more preferably in the range of from about 0.001 to 0.1, and most preferably in the range of from about 0.005 to about 0.02, parts by weight with one part by weight of the hydrazine compound. Amounts of quinone compound below the lowest limit cited herein start to lose the desired effect. Furthermore, amounts of quinone compounds above about 0.1 part by weight are uneconomical and do not add anything to the present compositions. However, since it may be desirable to store and/or ship these compounds in concentrated form, there is no upper limit as to the amount of quinone compound in the compositions of the present invention.

In another preferred embodiment of the present invention, it is desirable to employ a certain amount of selected organometallic complexes as additional catalysts with the quinone compounds. Specifically, the organometallic complexes used in the process of the present invention are the reaction products of cobaltous or magnagous hydroxide and selected organic ligands. In most cases, the cobaltous hydroxide [$Co(OH)_2$] is favored over manganous hydroxide [$Mn(OH)_2$]. However, both hydroxides, along with unstable hydroxides such as cobaltic or manganic hydroxides, are suitable for the present invention. These latter forms [i.e., Co(OH)$_3$ and Mn(OH)$_3$] normally will quickly reduce down to the cobaltous or manganous form in the presence of the above hydrazine compounds. Cobaltous and manganous hydroxide are both available commercially in various forms (e.g., "hydrate" or a dry powder, aqueous suspensions or slurries and the like) which can be readily used in the present invention.

In order to form these organometallic complexes, the above hydroxides are reacted with one or more organic ligands selected from the group consisting of unsubstituted and substituted amino derivatives of carboxylic acids and salts of these unsubstituted and substituted derivatives. These organic ligands are aliphatic or aromatic compounds which may have only one amino group or may have two or more amino groups, as more fully described below. The substituents which may be part of the organic ligand include any which do not hinder the formation of the organometallic complex or interfere with the oxygen scavenger accelerating function of the compositions of the present invention and will include alkyl, aralkyl, alkaryl, and aryl groups, e.g., having about 1 to about 14 and preferably about 1 to about 7 carbon atoms, as well as inorganic substituents such as the sulfonic acid radical and the like. These inert substituents may be located in any of the positions not occupied by the aforesaid amino radical or radicals. For example, these inert substituents may be located on A in Formula (VI) shown below or on $Y_1$ in Formula (XII) shown below. The salt forms of these organic ligands include the replacement of the hydrogen in the carboxylic acid radical of the ligand with a suitable cation, e.g, metal ion or ammonium or hydrazinium, which is capable of being replaced by a cobaltous or manganous ion. See the definition of B in the formulas below.

The organic ligands which may be used in forming the organometallic complexes used in the process of the present invention include those having the general formula:

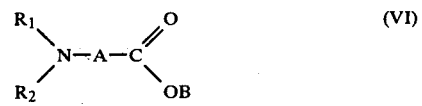
(VI)

wherein A is a branched or straight chain alkylene having 1 to about 10 carbon atoms, B is hydrogen or any suitable cation, e.g., metal ion or ammonium or hydrazinium, which is capable of being replaced by a cobaltous or manganous ion; and $R_1$ and $R_2$ are each independently selected from the group consisting of hydrogen, alkyls, aryls, the radical:

(VII)

wherein A and B are defined above, and the radical:

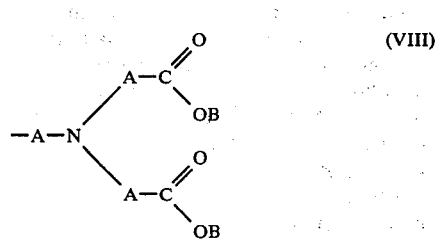

wherein each A and B are independently selected from the groups defined for A and B above, respectively.

Desirably, the ligand used in preparing the process of the present invention is one having the structure of Formula (VI) above wherein A has 1 to 4 carbon atoms, $R_1$ and $R_2$ are each independently selected from the group consisting of hydrogen, alkyls having 1 to 10 carbon atoms, aryls having 6 to 14 carbon atoms, and the radicals of Formulas (VII) and (VIII) above wherein A has 1 to 4 carbon atoms. Preferably, the ligand is one having the structure of Formula (VI) above wherein A has 1 to 3 carbon atoms and $R_1$ and $R_2$ are each independently selected from the group consisting of hydrogen, alkyls having 1 to 4 carbon atoms, and the radicals of Formulas (VII) and (VIII) above wherein A has 1 to 3 carbon atoms.

Exemplary of the most preferred ligands are (1) glycine and its salts, having the formula:

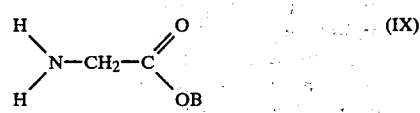

(2) nitrilotriacetic acid (NTA) and its salts, having the formula:

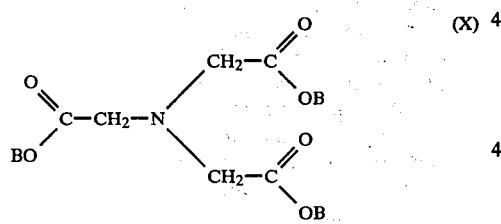

and (3) ethylenediamine tetraacetic acid (EDTA) and its salts, having the formula:

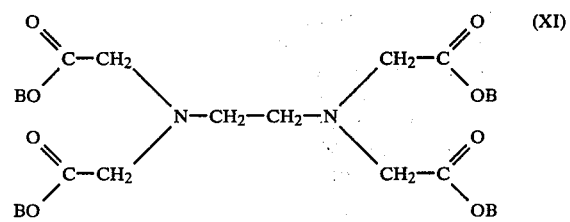

wherein B for each of Formulas (IX) through (XI) is as defined above, and especially wherein B is hydrogen.

Further, in addition to, though less desirable than the compounds represented by the foregoing, the organic ligands which may be used in forming the organometallic complexes used in the process of the present invention also include those having the general formula:

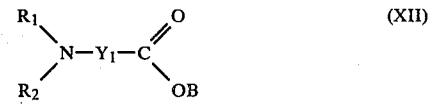

wherein B, $R_1$, and $R_2$ are as defined above, and wherein $Y_1$ is a substituted or unsubstituted ortho-arylene biradical.

Of the compounds represented by Formula (XII) above, desirably $Y_1$ is an ortho-phenylene or toluene or naphthalene radical, and $R_1$ and $R_2$ are each independently selected from the group consisting of hydrogen, alkyls having 1 to 10 carbon atoms, aryls having 6 to 14 carbon atoms, and the radicals of Formulas (VII) and (VIII) above wherein A has 1 to 4 carbon atoms. Of the compounds represented by Formula (XII) above, preferred are those wherein $Y_1$ is an ortho-phenylene or toluene or naphthalene radical, and $R_1$ and $R_2$ are each independently selected from the group consisting of hydrogen, alkyls having 1 to 4 carbon atoms, and the radicals of Formulas (VII) and (VIII) wherein A has 1 to 3 carbon atoms.

Exemplary of the compounds represented by Formula (XII) are the following:

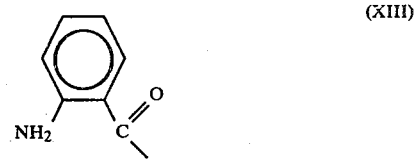

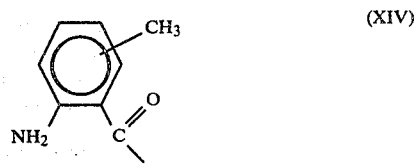

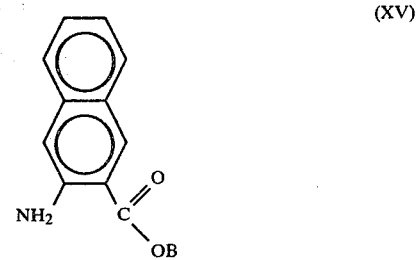

wherein, as applied to each of Formulas (XIII), (XIV), and (XV), B has the significance indicated above.

In forming the organometallic complexes, the hydroxide is reacted with the organic ligand so that about 0.1 to about 20 or even more gram-moles, and preferably about 0.5 to about 5 gram-moles of ligand are used per gram-atom of metal ion. Within these ranges, the optimum ratios of these two reactants will in general depend upon the particular ligand which is employed. Illustrative optimum ratios will be from about 0.8 to about 1.5 gram-moles of EDTA per gram-atom of metal ion, from about 1.6 to about 3.0 gram-moles of NTA per gram-atom of metal ion and from about 2.0 to about 4.5 gram-moles of glycine per gram-atom of metal ion.

These two components may advantageously be combined and reacted at room temperature and at atmospheric pressure. However, lower or higher temperatures and negative or positive pressures may be employed, if desired. Thus, temperatures ranging from about 10° or lower to about 100° C. or higher, and preferably from about 20° to about 50° C., and pressures from as low as 5 psi up to about 30 psi, and preferably within the range of from about 10 to about 15 psi may be used. At any rate, it can be seen that any combination of temperature and pressure may be used in preparing the organometallic complex provided that there is no significant detrimental effect on the reaction or on the desired products.

The reaction of the hydroxide and the organic ligand generally occurs in a reasonably short period of time and a significant amount of organometallic complex is obtained within a matter of minutes. The resulting organometallic complex may be dissolved in the reaction mixture or it may precipitate out of the reaction mixture. Regardless of the particular form of the organometallic complex, the complex is compatible with the reaction mixture and may be stored therein for an indefinite period of time. Because the reaction is usually completed in most cases somewhat in less than one hour and because the desired complex may be stored in the reaction mixture, there is no criticality to the maximum residence time involved in the reaction between the hydroxide and the organic ligand used in the present invention. If or when desired, the organometallic complex may be separated from the reaction mixture by any conventional means, e.g., by filtration or by distillation of the solvent. Alternatively, the organometallic complex need not be separated from the reaction mixture and the entire entity may be used as a component for the process of the present invention.

In those embodiments of the present invention where organometallic complexes as described above are combined with the aminoguanidine compound and the quinone compound, at least 0.0005 parts, more preferably in the range of about 0.002 parts to about 0.10 parts, by weight of the organometallic complex may be used per one part by weight of the aminoguanidine compound. In the most preferred embodiment of the present invention, from about 0.005 to about 0.03 parts by weight of the organometallic complex are employed per part of the aminoguanidine compound. The use of amounts of organometallic complex below the lowest limit cited above may result in a certain reduction in the catalytic effect on the oxygen-scavenging action of the aminoguanidine compound. The use of amounts of organometallic complex above the relative 0.1 parts by weight normally is generally uneconomical and may not give any further improvement to the desired catalytic action. However, it may be desirable to store and/or ship the compositions in a concentrated form whereby the amount of organometallic complex is greater than this upper limit. Such concentrated solutions are also encompassed by the present invention.

In one preferred embodiment, the organometallic complex, the quinone compound, and the aminoguanidine compound may be combined in one step prior to use of the resulting composition as an oxygen-scavenger, or the three components may be added separately or in any suitable combination to the fluid in the system to be treated. As alternatives to combining the organometallic complex and the quinone compound with the aminoguanidine compound either before or after being added to the fluidic corrosive environment to be treated, other approaches may advantageously be used. In one preferred embodiment, the organic ligand may be dissolved in an aminoguanidine compound solution and the cobaltous or manganous hydroxide, either in solid or suspension form, may subsequently be combined with the organic ligand-aminoguanidine compound solution, either before or after the organic ligand-aminoguanidine compound solution is added to the fluidic system to be treated, and the quinone compound may be added at any time.

In another preferred embodiment of the present invention, the hydroxide may first be suspended in an aminoguanidine compound solution and then the organic ligand may be combined therewith either before or after the hydroxide-aminoguanidine compound solution is added to the fluidic system to be treated and the quinone compound may be added to any component at any time. It should be noted that in these embodiments wherein the hydroxide and the organic ligand are not combined until added to the fluidic system to be treated, the organometallic complex is formed in situ. It should also be noted that regardless of the particular combining approach taken, the relative amounts of aminoguanidine compound, organic ligand, hydroxide, and quinone compound used are those set forth above. Therefore, it is clearly understood that the order of addition of the above-mentioned components to the environment is not critical and any suitable method of addition which results in the desired catalytic effect is encompassed within the scope of the invention.

Besides removing oxygen from boilers, the compound(s) may also be used in other aqueous systems such as hot water systems, oil wells using water injection systems, and the like. The compound(s) may be also used in other quiescent and running bodies of water such as in industrial plants or in long distance heating supply systems. Since the compound(s) is consumed during oxygen removal, the concentration of active compounds in the treated liquid system should be determined periodically and additional compound(s) of the present invention should be added to maintain the concentration of the compound(s) at an effective amount.

Besides aqueous systems, the process of the present invention may be used to remove oxygen and reduce or inhibit corrosion in inorganic and organic liquid and gas systems (e.g., heat exchange systems employing glycol coolant systems).

Also, as used herein in both the specifications and claims, the terms "fluidic", "aqueous", "water", "aqueous systems", and the like when defined to mean oxygen-containing fluids and water to which protection against corrosion is sought, are intended to include not only fluids or water in liquid form, but also as fluids or water in vapor form, including steam and aqueous solutions for cooling systems.

The following examples are presented to further illustrate the invention. All parts and percentages are by weight unless explicitly stated otherwise.

EXAMPLE 1

Aminoguanidinium Phosphate (AGP)

Aminoguanidine bicarbonate (38 g, 0.5 mole) was slurried in 150 ml of water and phosphoric acid (59.5 g of 85% $H_3PO_4$, 0.5 mole) dropped in causing the evolution of carbon dioxide. After stirring about a half hour a clear solution resulted. Approximately one half the solvent was vacuum stripped and the remaining solution cooled to precipitate the product. The solids were filtered, ethanol washed and vacuum dried to give 76.3 g of product melting 140.5°–142.5° C.

Analysis—Calculated for $CH_9N_4O_4P$: C, 6.98; H, 5.27; N, 32.56. Found: C, 6.93; H, 5.11; N, 32.13.

EXAMPLE 2

Diaminoguanidinium Nitrate (DAGN)

64% Hydrazine solution (50 g, 1 mole) and 70% nitric acid (45 g, 0.5 mole) were carefully mixed in 200 ml of ethanol. 50% Aqueous cyanamide solution (42 g, 0.5 mole) was added and the mixture refluxed two hours. The solution was cooled to 20° C. precipitating the product which was then recrystallized from methanol giving 15 g of white solid.

Analysis—Calculated for $CH_8N_6O_3$: C, 7.90; H, 5.30; N, 55.25. Found: C, 7.91; H, 5.27; N, 54.91.

EXAMPLE 3

Triaminoguanidinium Nitrate (TAGN)

Hydrazine hydrate (25 g, 0.5 mole) and 70% nitric acid (45 g, 0.5 mole) were carefully mixed in 50 ml of water while cooling. To this mixture was added a 50% aqueous cyanamide solution (42 g, 0.5 mole). Then additional hydrazine hydrate (60 g, 1.2 moles) was added and the solution refluxed 5.5 hours. On cooling the product separated as white crystals. It was filtered, methanol washed and dried. Yield—41.8 g.

Analysis—Calculated for $CH_9N_7O_3$: C, 7.19; H, 5.43; N, 58.67. Found: C, 7.10; H, 4.99, N, 57.16.

The product assayed 97.1% by titration.

EXAMPLE 4

Triaminoguanidine (TAG)

Triaminoguanidinium nitrate (15 g, 0.09 mole) was dissolved in 50 ml of water containing sodium hydroxide (4 g, 0.1 mole). To this was added dimethylformamide (90 ml) and the mixture cooled to give triaminoguanidine as the free base, 8 g of mp 107°–112° C. (lit 112°–120°). The material was not very stable in the air and was stored under nitrogen and tested shortly after preparation or converted quickly to the sulfate salt is shown in Example 5. This synthesis method is from *J. Organic Chemistry*, 29, 3729, (1964).

EXAMPLE 5

Triaminoguanidinium Sulfate (TAGS)

Triaminoguanidine (5.2 g, 0.05 mole) was dissolved in a mixture of water and ethanol and sulfuric acid (4.9 g, 0.05 mole) added. A white precipitate formed which was filtered, ethanol washed and dried to give 7.9 g of product.

Analysis—Calculated for $CH_{10}N_6O_4S$: C, 5.93; H, 4.98; N, 41.57. Found: C, 6.63; H, 4.83; N, 42.89.

EXAMPLE 6

Triaminoguanidinium Chloride (TAGC)

Guanidine hydrochloride (57 g, 1.67 mole) was placed in 500 ml of ethanol and 64% hydrazine solution (157 g, 3.14 mole) was added and the mixture refluxed 4 hours. On cooling the product formed. It was filtered, washed and dried giving 71.5 g of crude TAGC. Recrystallization from water left 61.8 g of product.

Analysis—Calculated for $CH_9N_6Cl$: C, 8.54; H, 6.43; N, 59.78. Found: C, 8.55; H, 6.25; N, 59.82.

EXAMPLE 7

Aminoguanidinium Chloride (AGC)

This material was not isolated, but was made in situ by adding equimolar amounts of aminoguanidinium bicarbonate and hydrochloric acid liberating carbon dioxide and forming a solution of the product.

Diaminoguanidinium chloride (DAGC) was purchased from Aldrich Chemical Company.

EXAMPLE 8

Bis(Aminoguanidinium) Phosphate (2AG-P)

Aminoguanidinium phosphate (17.2 g, 0.1 mole) was dissolved in 150 ml of water and aminoguanidinium bicarbonate (13.8 g of 98.5%, 0.1 mole) added to give a white slurry. The mixture was slowly heated to 75° C. and held for ¾ hour to give a clear solution. On cooling a few solids formed. They were filtered off and the filtrate stripped, removing about 100 ml of water. On cooling a solid formed. It was filtered and dried giving 6.8 g. This was then recrystallized from water/ethanol to give 4 g.

Analysis—Calculated for $C_2H_{15}N_8O_4P$: C, 9.76; H, 6.10; N, 45.53. Found: C, 10.30; H, 6.52; N, 44.19.

EXAMPLE 9

Bis(Aminoguanidinium) Sulfate (2AG-S)

Aminoguanidinium bicarbonate (27.2 g of 98.5%, 0.2 mole) was slurried in 150 ml of water. Sulfuric acid (10.2 g of 96%, 0.1 mole) was added over ¼ hour with the evolution of carbon dioxide. After post-reacting one hour at room temperature, 125 ml of water were vacuum stripped. On cooling a white precipitate formed which was filtered and dried. Obtained were 11 g of product.

Analysis—Calculated for $C_2H_{16}N_8O_5S$: C, 9.09, H, 6.06; N, 42.42. Found: C, 9.18; H, 5.53; N, 42.40.

BENCH SCALE DEOXYGENATION STUDIES

The following experimental laboratory work shows that the above-made compounds are effective deoxygenation agents at ambient temperature (i.e., at about 20° C. to about 25° C.).

These deoxygenation measurements were run in one liter round bottom flasks each equipped with a small septum-covered side arm and a standard taper joint into which was inserted the probe of an oxygen meter (Model 54 made by Yellow Springs Instrument Co. of Yellow Springs, Ohio). For each test, the flask was filled with air-saturated, distilled or deionized water buffered with $Na_2CO_3/NaHCO_3$ to a pH of 9.7. The amount of dissolved $O_2$ content in the water was about 8 parts per million parts of $H_2O$ by weight (about $2.4 \times 10^{-4}$ moles per liter).

After filling the flask with water, the probe was inserted into the flask and an aqueous solution containing the compounds made according to Examples 1–9 and an equivalent amount of 25% caustic solution was injected through the septum-covered side arm with a hypodermic needle. The amount of compound injected will result in about a 150 ppm $N_2H_4$ equivalent test solution.

The rate of dissolved oxygen disappearance was observed on a YSI meter and recorded on a strip chart. The percent oxygen removed after one minute and after eight minutes was reported. This experiment was repeated, with other known oxygen-scavengers, namely, carbohydrazide catalyzed with hydroquinone and carbohydrazide catalyzed with both hydroquinone and a Co-EDTA complex. These results are shown in Table I, below.

TABLE I

Oxygen Removal at Ambient Temperature

| Scavenger System | Catalyst | Percent O2 1 min. | Removed 8 mins. |
|---|---|---|---|
| AGP | | 0 | 6 |
| AGP | HQ[1] | 40 | 44 |
| AGP | HQ + Co[2] | 47 | 56 |
| AGC | HQ | 66 | 94 |
| AGC | HQ + Co | 50 | 95 |
| DAGN | HQ | 34 | 54 |
| DAGN | HQ + Co | 28 | 59 |
| DAGC | HQ | 43 | 56 |
| DAGC | HQ + Co | 22 | 50 |
| TAG | HQ | 15 | 37 |
| TAG | HQ + Co | 35 | 90 |
| TAGS | | 5 | 29 |
| TAGS | HQ | 40 | 64 |
| TAGS | HQ + Co | 50 | 87 |
| TAGN | HQ | 46 | 66 |
| TAGC | HQ + Co | 47 | 98 |
| TAGC | HQ | 18 | 41 |
| TAGC | HQ + Co | 35 | 88 |
| CH[3] | | 10 | 45 |
| CH | HQ | 26 | 55 |
| CH | HQ + Co | 21 | 45 |
| 2AG-P | | 0 | 0 |
| 2AG-P | HQ | 19 | 21 |
| 2AG-P | HQ + Co | 12 | 17 |
| 2AG-S | | 0 | 0 |
| 2AG-S | HQ | 25 | 28 |
| 2AG-S | HQ + Co | 25 | 37 |

[1] HQ = hydroquinone [1 ml of aqueous solution containing $9 \times 10^{-4}$ grams HQ]
[2] Co = cobalt-EDTA complex [1 ml of aqueous solution containing $7.7 \times 10^{-4}$ grams Co(OH)2 and $2.26 \times 10^{-3}$ grams EDTA]
[3] CH = carbohydrazide [equivalent to 150 ppm N2H4]

BENCH SCALE CORROSION TESTS

Metal coupons (steel, copper, brass, bronze, and admiralty) were individually placed in separate 500 ml flasks containing water (buffered to a pH of 8.5 with Na2CO3/NaHCO3 buffer). Selected amounts of AGP or TAGN were placed into each flask. The flasks were then allowed to stand for a period of 4 weeks. The corrosion rates, in mils per year (mpy), were measured and are summarized in Table II and III. As can be seen the amount of corrosion for each metal was very small.

TABLE II

| | Amount of AGP | |
|---|---|---|
| Metal | Equivalent to 30 ppm N2H4 | Equivalent to 2000 ppm N2H4 |
| Steel | 0.136 mpy | 0.017 mpy |
| Copper | 0.050 mpy | 0.600 mpy |
| Brass | 0.034 mpy | 0.054 mpy |
| Bronze | 0.058 mpy | 0.043 mpy |
| Admiralty | 0.034 mpy | 0.055 mpy |

TABLE III

| | Amount of TAGN | |
|---|---|---|
| Metal | Equivalent to 30 ppm N2H4 | Equivalent to 2000 ppm N2H4 |
| Steel | 0.283 mpy | 0.772 mpy |
| Copper | 0.032 mpy | 0.025 mpy |
| Brass | 0.037 mpy | 0.026 mpy |
| Bronze | 0.045 mpy | 0.027 mpy |
| Admiralty | 0.042 mpy | 0.028 mpy |

What is claimed is:

1. A method for scavenging oxygen and for protecting metal surfaces against corrosion caused by contact of an oxygen-containing fluid therewith comprising adding an effective amount of an aminoguanidine compound to scavenge at least a portion of the oxygen contained therein and to inhibit corrosion on the metal surfaces in contact therewith; said aminoguanidine compound selected from the formula

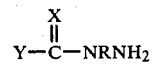

or a salt thereof; wherein R is selected from H or a lower alkyl group having 1 to 4 carbon atoms; wherein X is selected from NH or NNH2; and Y is selected from —NH2 or —NHNH2.

2. The method of claim 1 wherein said fluidic system is an aqueous one.
3. The method of claim 2 wherein said aqueous system is a boiler water system.
4. The method of claim 1 wherein the amount of said aminoguanidine added to said fluidic system is from about 0.01 to about 1000 parts by weight of said aminoguanidine compound per million parts of fluid.
5. The method of claim 1 wherein R is hydrogen.
6. The method of claim 5 wherein said aminoguanidine compound is a salt of monoaminoguanidine.
7. The method of claim 6 wherein said salt of monoaminoguanidine is monoaminoguanidine phosphate.
8. The method of claim 1 wherein a catalytic amount of a quinone compound is added with said aminoguanidine compound.
9. The method of claim 8 wherein said quinone compound is methylhydroquinone.
10. The method of claim 8 wherein an organometallic complex is further added with said aminoguanidine compound, said organometallic complex being the reaction product of
   (i) a hydroxide selected from the group consisting of cobaltous hydroxide and manganous hydroxide; and
   (ii) at least one organic ligand selected from the group consisting of unsubstituted and substituted amino derivatives of carboxylic acids and salts thereof.
11. The method of claim 10 wherein said organic ligand is ethylenediamine tetraacetic acid (EDTA) and its salts.

* * * * *